(12) United States Patent
Wada (10) Patent No.: US 12,109,855 B2
(45) Date of Patent: *Oct. 8, 2024

(54) MULTI AIR CHAMBER TIRE AND METHOD FOR CONTROLLING INTERNAL PRESSURE OF SAME

(71) Applicant: BRIDGESTONE CORPORATION, Tokyo (JP)

(72) Inventor: Shogo Wada, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 539 days.

This patent is subject to a terminal disclaimer.

(21) Appl. No.: 17/283,249

(22) PCT Filed: Sep. 10, 2019

(86) PCT No.: PCT/JP2019/035544
§ 371 (c)(1),
(2) Date: Apr. 7, 2021

(87) PCT Pub. No.: WO2020/110419
PCT Pub. Date: Jun. 4, 2020

(65) Prior Publication Data
US 2021/0339567 A1 Nov. 4, 2021

(30) Foreign Application Priority Data
Nov. 30, 2018 (JP) .................................. 2018-225972

(51) Int. Cl.
*B60C 5/20* (2006.01)
*B60C 5/22* (2006.01)
(Continued)

(52) U.S. Cl.
CPC ................. *B60C 5/20* (2013.01); *B60C 5/22* (2013.01); *B60C 19/00* (2013.01); *B60C 23/04* (2013.01);
(Continued)

(58) Field of Classification Search
CPC ..... Y10T 152/10585; Y10T 152/10603; Y10T 152/10612; B60C 5/22; B60C 5/025; B60C 29/007; B60C 5/20; B60C 23/0484
(Continued)

(56) References Cited

U.S. PATENT DOCUMENTS 564,763 A * 7/1896 Pulbrook ................... 152/341.1
2,433,696 A * 12/1947 Hruska ...................... 152/339.1
(Continued)

FOREIGN PATENT DOCUMENTS

| CN | 106739852 A | 5/2017 |
|---|---|---|
| CN | 107000511 A | 8/2017 |

(Continued)

OTHER PUBLICATIONS

English machine translation of DE 199 61 266 A1, Dec. 7, 2001.*
(Continued)

*Primary Examiner* — Adrienne C. Johnstone
(74) *Attorney, Agent, or Firm* — KENJA IP LAW PC (57) ABSTRACT

A multi air chamber tire 1 includes a partition wall 30 configured to define and form a plurality of air chambers 20 disposed adjacent to each other in an inner cavity of a tire, and a ventilation member 10 provided to the partition wall 30, and configured to connect the plurality of air chambers 20 in a state where ventilation is allowed. The ventilation member 10 allows ventilation between the plurality of air chambers 20 when a predetermined condition is satisfied indicating that fluid is being injected into at least one of the plurality of air chambers 20 from outside of the tire, and the
(Continued)

ventilation member 10 shuts off the ventilation between the plurality of air chambers 20 when the predetermined condition is not satisfied.

6 Claims, 8 Drawing Sheets

(51) Int. Cl.
  *B60C 19/00* (2006.01)
  *B60C 23/04* (2006.01)
  *B60C 29/00* (2006.01)
(52) U.S. Cl.
  CPC ........ *B60C 23/0484* (2013.01); *B60C 29/007* (2013.01); *B60C 2019/004* (2013.01); *Y10T 152/10585* (2015.01); *Y10T 152/10612* (2015.01)
(58) Field of Classification Search
  USPC ............................................ 152/339.1–342.1
  See application file for complete search history.

(56) References Cited

U.S. PATENT DOCUMENTS

| | | | |
|---|---|---|---|
| 2,563,788 | A | 8/1951 | Keefe |
| 2,871,904 | A | 2/1959 | Greenlee |
| 2,898,969 | A | 8/1959 | Pfeiffer |
| 2,925,845 | A * | 2/1960 | Merz .......................... 152/339.1 |
| 4,280,546 | A | 7/1981 | Mistretta |
| 10,479,146 | B2 | 11/2019 | Stuckey |
| 11,970,030 | B2 * | 4/2024 | Wada ........................ B60C 5/22 |
| 2018/0290504 | A1 | 10/2018 | Berger |

FOREIGN PATENT DOCUMENTS

| | | | |
|---|---|---|---|
| DE | 3430520 | A1 | 2/1986 |
| DE | 199 61 266 | A1 * | 12/2001 |
| FR | 2.087.349 | A5 * | 12/1971 |
| GB | 2024737 | A | 1/1980 |
| JP | 85042504 | A | 4/1975 |
| JP | 862105803 | U | 7/1987 |
| JP | 2002067610 | A | 3/2002 |
| JP | 2007137212 | A | 6/2007 |
| JP | 2007223477 | A | 9/2007 |
| JP | 2008308125 | A | 12/2008 |
| JP | 2009107541 | A | 5/2009 |
| JP | 2013220747 | A | 10/2013 |
| JP | 2015077922 | A | 4/2015 |
| JP | 2018012419 | A | 1/2018 |
| JP | 2018500222 | A | 1/2018 |
| JP | 2018522769 | A | 8/2018 |
| KR | 1020120088218 | A * | 8/2012 |
| KR | 1020170034989 | A | 3/2017 |
| WO | 9208621 | A1 | 5/1992 |
| WO | WO-2016/089593 | A1 * | 6/2016 |

OTHER PUBLICATIONS

English machine translation of KR 10-2012-0088218 A, Aug. 8, 2012.*
English machine translation of JP 2008-308125 A, Dec. 25, 2008.*
English machine translation of KR 10-2017-0034989 A, Mar. 30, 2017.*
English machine translation of CN 106739852 A, Jan. 9, 2017.*
English machine translation of FR 2.087.349 A5, Dec. 31, 1971.*
Mechanics of Pneumatic Tires, ed. Samuel Clark, US Dept. of Transportation, Aug. 1981, p. 209.*
Oct. 19, 2022, search result of Office Action issued by the China National Intellectual Property Administration in the corresponding Chinese Patent Application No. 201980078627.X.
Nov. 26, 2019, International Search Report issued in the International Patent Application No. PCT/JP2019/035544.
May 25, 2021, International Preliminary Report on Patentability issued in the International Patent Application No. PCT/JP2019/035544.
Aug. 3, 2022, search result of the Extended European Search Report issued by the European Patent Office in the corresponding European Patent Application No. 19889776.1.
Jul. 5, 2022, search result of Office Action issued by the China National Intellectual Property Administration in the corresponding Chinese Patent Application No. 201980078627.X.

* cited by examiner

Variant of FIG. 3 wherein each second coupling portion 9b is coupled with the tire inner wall surface at a position both outward of the respective ground contact edge of the tread portion 4 in the tire width direction and inward of the respective maximum width position of the belt 6 in the tire width direction by 10% to 20% of the maximum width of the belt 6.

MULTI AIR CHAMBER TIRE AND METHOD FOR CONTROLLING INTERNAL PRESSURE OF SAME

TECHNICAL FIELD

The present disclosure relates to a multi air chamber tire, a ventilation member, a method for controlling an internal pressure of a multi air chamber tire, and a method for controlling a ventilation member.

BACKGROUND

Conventionally, there are tires which allow safe travel over a certain distance even in a state where the internal pressure of the tire is reduced due to tire failure, such as a puncture. For example, PTL 1 discloses a tire which incorporates a tube having a plurality of air chambers, thus allowing continuous travel even when air leaks to the outside from any one of the plurality of air chambers at the time of tire failure.

CITATION LIST

Patent Literature

PTL 1: Japanese Patent Laid-Open No. 2002-67610

SUMMARY

Technical Problem

However, in the above-mentioned conventional multi air chamber tire having the plurality of air chambers, each of the plurality of air chambers is independently filled with gas, so adjustment of the internal pressures of the plurality of air chambers requires time and effort. Accordingly, tires having a plurality of air chambers have room for improvement in regard to adjustment of the internal pressures of the plurality of air chambers.

The present disclosure has been made under such circumstances, and it is an object of the present disclosure to provide a multi air chamber tire, a ventilation member, a method for controlling an internal pressure of a multi air chamber tire, and a method for controlling a ventilation member, which can improve convenience of the multi air chamber tire having the plurality of air chambers.

Solution to Problem

A multi air chamber tire according to the present disclosure includes a partition wall configured to define and form a plurality of air chambers disposed adjacent to each other in an inner cavity of a tire, and a ventilation member provided to the partition wall, and configured to connect the plurality of air chambers in a state where ventilation is allowed. The ventilation member allows ventilation between the plurality of air chambers when a predetermined condition is satisfied indicating that fluid is being injected into at least one of the plurality of air chambers from outside of the tire, and the ventilation member shuts off the ventilation between the plurality of air chambers when the predetermined condition is not satisfied.

A ventilation member according to the present disclosure is used in the above-mentioned multi air chamber tire.

A method for controlling an internal pressure of a multi air chamber tire according to the present disclosure includes the steps of: allowing, by the ventilation member, ventilation between the plurality of air chambers when a predetermined condition is satisfied indicating that fluid is being injected into at least one of the plurality of air chambers from outside of a tire; and shutting off, by the ventilation member, the ventilation between the plurality of air chambers when the predetermined condition is not satisfied.

A method for controlling a ventilation member according to the present disclosure is a method for controlling the ventilation member of the above-mentioned multi air chamber tire, the method including the steps of: allowing, by the ventilation member, ventilation between the plurality of air chambers when a predetermined condition is satisfied indicating that fluid is being injected into at least one of the plurality of air chambers from outside of a tire; and shutting off, by the ventilation member, the ventilation between the plurality of air chambers when the predetermined condition is not satisfied.

Advantageous Effect

According to the present disclosure, it is possible to provide a multi air chamber tire, a ventilation member, a method for controlling an internal pressure of a multi air chamber tire, and a method for controlling a ventilation member, which can improve convenience of the multi air chamber tire having the plurality of air chambers.

DETAILED DESCRIPTION

Hereinafter, a multi air chamber tire according to one embodiment of the present disclosure will be described with reference to drawings. In the respective drawings, identical members and portions are given the same reference symbols.

Figure 1:
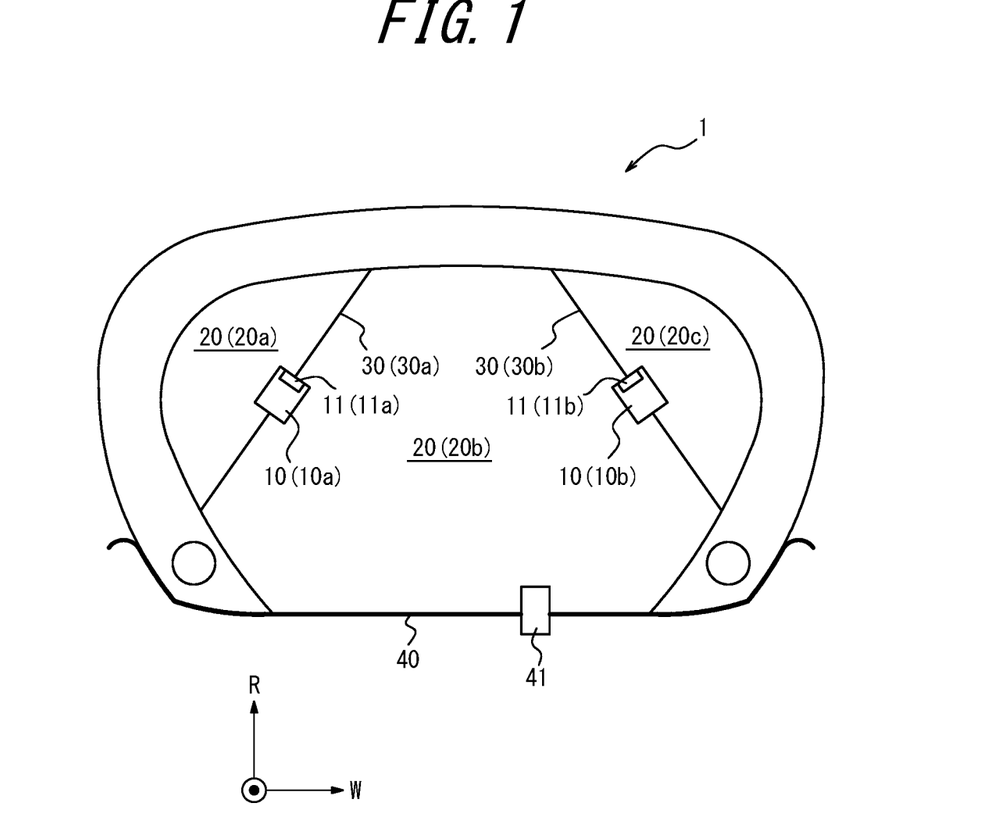
FIG. 1 is a schematic view schematically illustrating a multi air chamber tire according to one embodiment of the present disclosure in a state of being mounted on a rim.

FIG. 1 is a schematic view schematically illustrating a multi air chamber tire 1 (hereinafter also referred to as "tire 1") of one embodiment of the present disclosure in a state of being mounted on a rim 40. The schematic view is a tire width direction cross-sectional view of the tire 1 taken along a tire width direction. In FIG. 1, the tire 1 includes a pair of partition walls 30a and 30b which defines an inner cavity of the tire, the partition walls 30a and 30b being respectively provided to half portions of the tire which are defined with respect to a tire equator plane CL. The partition walls 30a and 30b are film members coated with rubber, for example. However, the partition walls 30a and 30b are not limited to the above, and may be any partition walls which prevent leakage of a gas, such as air. Hereinafter, the description will be made by taking air as an example of a gas generally filled into the inner cavity of the tire. With such a configuration, when the tire 1 is mounted on the rim 40 and is filled with air, three air chambers 20a, 20b, and 20c are defined and formed in the tire 1 by the partition walls 30a and 30b. Ventilation members 10a and 10b are respectively provided to two partition walls 30a and 30b. The ventilation members 10a and 10b are valves, for example. However, the ventilation members 10a and 10b are not limited to valves, and may be any ventilation members which allow ventilation between the air chambers, or can regulate the ventilation. Hereinafter, when the ventilation members 10a and 10b are not particularly distinguished from each other, the ventilation members 10a and 10b are collectively simply referred to as "ventilation member 10". When the partition walls 30a and 30b are not particularly distinguished from each other, the partition walls 30a and 30b are collectively simply referred to as "partition wall 30". When the air chambers 20a, 20b and 20c are not particularly distinguished from each other, the air chambers 20a, 20b and 20c are collectively simply referred to as "air chamber 20".

When air is leaking to the outside from any one of the air chambers 20 due to tire failure, the ventilation member 10 regulates ventilation between the air chambers 20 to reduce the amount of leakage of air from the air chamber 20 having no air leakage, thus allowing continuous travel. In contrast, when air is filled into the tire 1, the ventilation member 10 allows ventilation between the air chambers 20, thus allowing portions of air filled into the air chamber 20b from a valve 41 of the rim 40 to reach the air chambers 20a and 20c, for example. Accordingly, air can be filled into the tire 1 from the valve 41 of the rim 40 in the same manner as a tire which does not have a plurality of air chambers.

Figure 2:
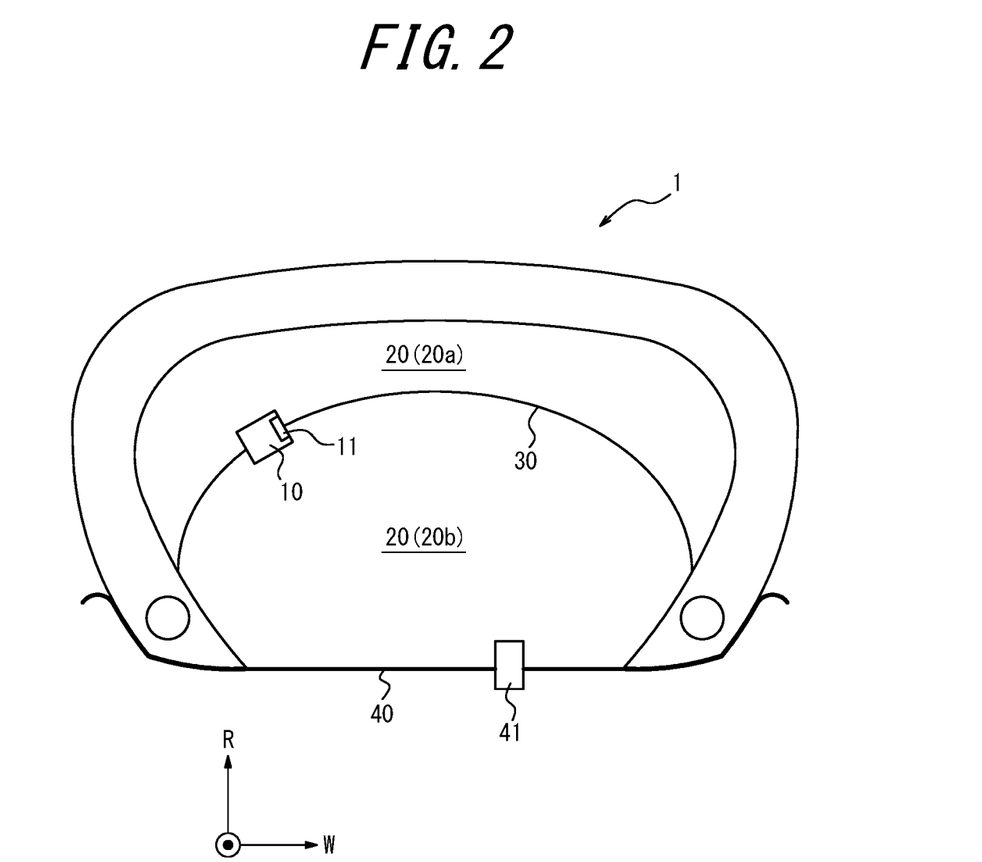
FIG. 2 is a schematic view schematically illustrating a modification of the multi air chamber tire according to the present disclosure in a state of being mounted on the rim.

In FIG. 1, the tire 1 includes two ventilation members 10, two partition walls 30, and three air chambers 20 defined in the tire width direction. However, the numbers and the positions of ventilation members 10, partition walls 30, and air chambers 20 are not limited to the above. FIG. 2 is a schematic view schematically illustrating a modification of the multi air chamber tire 1 in a state of being mounted on the rim 40. For example, as illustrated in FIG. 2, the tire 1 includes one ventilation member 10 and one partition wall 30. Therefore, in the tire 1, two air chambers 20a and 20b can be defined and formed in a tire radial direction by the partition wall 30. Further, in the tire 1, the ventilation member 10 can connect the two air chambers 20a and 20b in a state where ventilation is allowed. The number of air chambers 20 formed in the inner cavity of the tire 1 may be suitably designed according to the application of the tire 1.

(Configuration of Multi Air Chamber Tire)

Next, the configuration of the multi air chamber tire 1 will be described in detail.

Hereinafter, unless otherwise specified, assume that dimensions of respective elements, the length relationship, the positional relationship and the like are measured in the reference state where a multi air chamber tire serving as a pneumatic tire is mounted on an applicable rim, the multi air chamber tire is filled with a prescribed internal pressure, and no load is applied to the multi air chamber tire. Further, a width in the tire width direction of a contact patch which comes into contact with a road surface in a state where the tire is mounted on the applicable rim, the tire is filled with the prescribed internal pressure, and the maximum load is applied to the tire is referred to as "ground contact width of the tire", and an edge portion in the tire width direction of the ground contact width of the tire is referred to as "ground contact edge".

In this specification, "applicable rim" indicates an approved rim (Measuring Rim in STANDARDS MANUAL of ETRTO, and Design Rim in YEAR BOOK of TRA) having an applicable size which is described or which will be described in the future in the industrial standards applicable to regions where pneumatic tires are produced and used, including JATMA YEAR BOOK by JATMA (the Japan Automobile Tyre Manufacturers Association) in Japan, STANDARDS MANUAL by ETRTO (The European Tyre and Rim Technical Organisation) in Europe, and YEAR BOOK by TRA (The Tire and Rim Association, Inc.) in the United States of America. In the case of a size not described in these industrial standards, "applicable rim" indicates a rim having a width which corresponds to the bead width of a pneumatic tire. The term "applicable rim" also includes a size which may be included in the above-mentioned industrial standard in the future in addition to the current size. An example of "size which will be described in the future" includes a size described as "FUTURE DEVELOPMENTS" in ETRTO 2013.

In this specification, "prescribed internal pressure" indicates an air pressure (maximum air pressure) which corresponds to the maximum load capability of a single wheel having an applicable size and a ply rating, and which is described in the industrial standard, such as the above-mentioned JATMA YEAR BOOK. In the case of a size not described in the above-mentioned industrial standard, "prescribed internal pressure" indicates an air pressure (maximum air pressure) which corresponds to the maximum load capability specified for each vehicle on which the tire is mounted. In this specification, "maximum load" indicates a load which corresponds to the maximum load capability of a tire having an applicable size described in the above-mentioned industrial standard. In the case of a size not described in the above-mentioned industrial standard, "maximum load" indicates a load which corresponds to the maximum load capability specified for each vehicle on which the tire is mounted.

Figure 3:
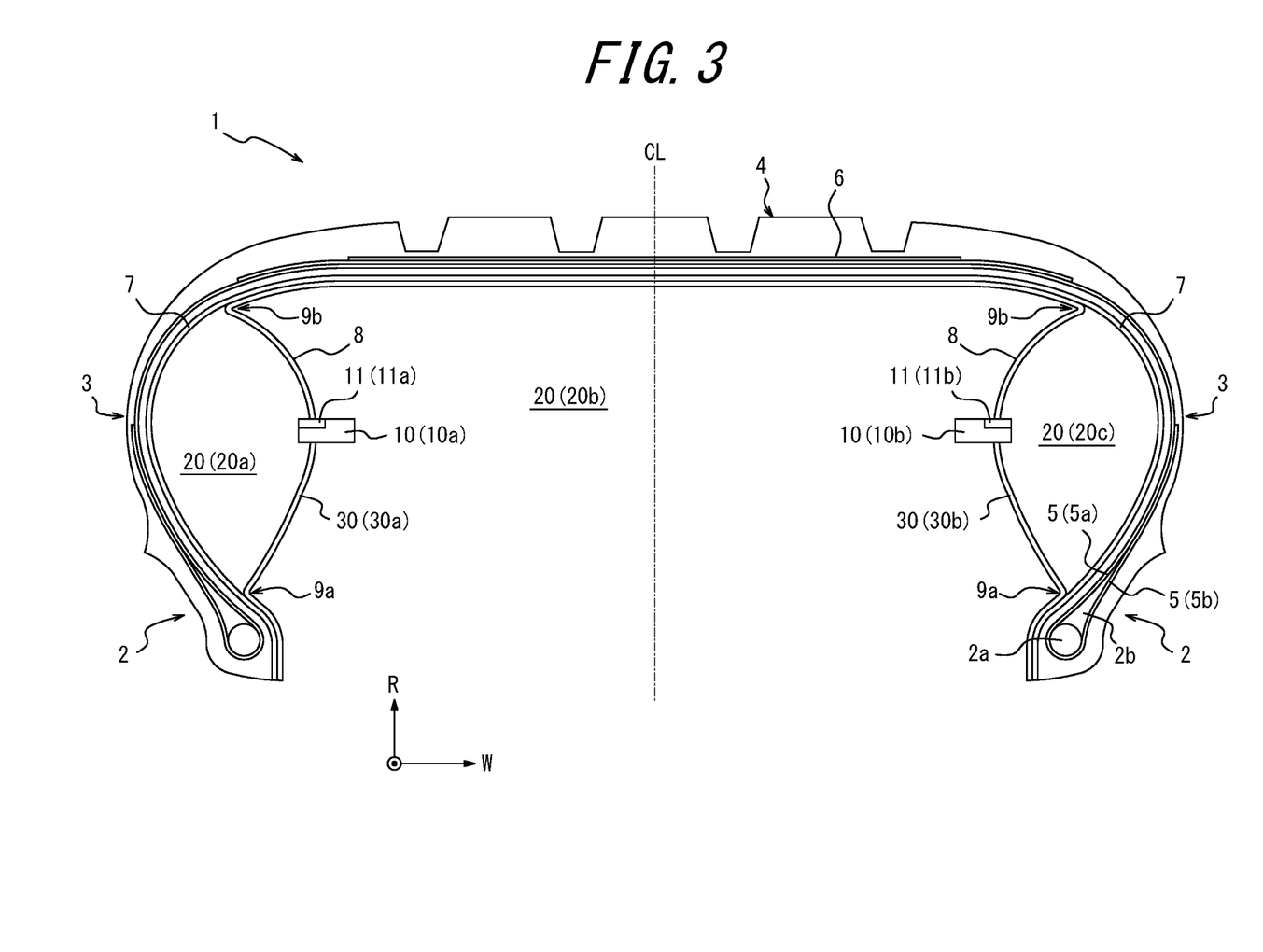
FIG. 3 is a tire width direction cross-sectional view of the multi air chamber tire according to one embodiment of the present disclosure.

FIG. 3 is a tire width direction cross-sectional view of the multi air chamber tire 1 according to one embodiment of the present disclosure (hereinafter also referred to as "tire 1") taken along the tire width direction. In this specification, the tire width direction indicates a direction parallel to the rotation axis of the tire 1. In FIG. 3, the tire width direction is indicated by an arrow W. Further, the tire radial direction indicates a direction orthogonal to the rotation axis of the tire 1. In FIG. 3, the tire radial direction is indicated by an arrow R. The description will be made assuming that the tire 1 has a symmetrical configuration with respect to the tire equator plane CL. However, the configuration of the tire 1 is not limited to the above. The tire 1 may have an asymmetrical configuration with respect to the tire equator plane CL.

In this specification, a direction toward the rotation axis of the tire 1 in the tire radial direction is referred to as "inward in the tire radial direction", and a direction away from the rotation axis of the tire 1 in the tire radial direction is referred to as "outward in the tire radial direction". A direction toward the tire equator plane CL in the tire width direction is referred to as "inward in the tire width direction", and a direction away from the tire equator plane CL in the tire width direction is referred to as "outward in the tire width direction".

As illustrated in FIG. 3, the tire 1 includes a pair of bead portions 2, a pair of sidewall portions 3, and a tread portion 4. Each sidewall portion 3 extends between the tread portion 4 and the bead portion 2. The sidewall portion 3 is located at a position outward of the bead portion 2 in the tire radial direction.

Each of the pair of bead portions 2 includes a bead core 2a and a bead filler 2b. The bead core 2a includes a plurality of bead wires coated with rubber around their peripheries. Each bead wire is formed of a steel cord. The steel cord may be formed of a steel monofilament or stranded wire, for example. The bead filler 2b is made of rubber or the like, and is located at a position outward of the bead core 2a in the tire radial direction. In this embodiment, the thickness of the bead filler 2b reduces toward the outward tire radial direction. The tire 1 may have a structure which includes no bead filler 2b. Each bead portion 2 is configured to be brought into contact with a rim at a position inward in the tire radial direction and outward in the tire width direction when the tire 1 is mounted on the rim.

The tire 1 includes a carcass 5. The carcass 5 extends in a toroidal shape between the pair of bead cores 2a, thus forming the skeleton of the tire. End portions of the carcass 5 engage with the bead cores 2a. Specifically, the carcass 5 includes a carcass main body portion 5a and carcass foldback portions 5b. The carcass main body portion 5a is disposed between the bead cores 2a. Each carcass fold-back portion 5b is provided on the periphery of the bead core 2a, and is obtained by folding back the carcass 5 to extend from a position inward in the tire width direction toward a position outward in the tire width direction. A length of the carcass fold-back portion 5b from the position inward in the tire width direction toward the position outward in the tire width direction may be set to a desired length. The carcass 5 may have a structure which includes no carcass fold-back portion 5b, or may have a structure where each carcass fold-back portion 5b is wound around the bead core 2a.

The carcass 5 may be formed of one or more carcass layers. For example, the carcass 5 may be formed of two carcass layers arranged in a laminated manner in the tire radial direction in the tire equator plane CL. A carcass cord which forms the carcass layer of the carcass 5 is made of polyester, for example. However, the configuration is not limited to the above. For example, the carcass cord may be made of an organic fiber, such as nylon, rayon, or aramid, and metal, such as steel. In this embodiment, the carcass 5 has a radial structure. However, the carcass 5 is not limited to the radial structure, and may have a bias structure.

In the tread portion 4, a belt 6 and a tread rubber which reinforce the tread portion 4 are provided at positions outward of the carcass 5 in the tire radial direction. The belt 6 may be formed of a plurality of belt layers laminated in the tire radial direction, for example. A belt cord which forms the belt layer of the belt 6 is made of polyester, for example. However, the belt cord is not limited to polyester, and may be made of an organic fiber, such as nylon, rayon, or aramid, and metal, such as steel, for example.

The tire 1 includes an inner liner 7. The inner liner 7 is disposed such that the inner liner 7 covers the inner wall surface of the tire 1. The inner liner 7 may be formed of a plurality of inner liner layers laminated in the tire radial direction in the tire equator plane CL. The inner liner 7 is made of butyl-based rubber having low air permeability, for example. The butyl-based rubber includes butyl rubber, and halogenated butyl rubber, which is a derivative of butyl rubber, for example. The inner liner 7 is not limited to butyl-based rubber, and may be made of other rubber composition, a resin, or elastomer.

The tire 1 includes a reinforcement layer 8. The reinforcement layer 8 is disposed such that the reinforcement layer 8 covers the inner wall surface of the tire 1 at a position inward of the inner liner 7 and the inner wall surface of the tire. The reinforcement layer 8 is a film member coated with rubber, for example. The reinforcement layer 8 may be any member, such as a film, which has low permeability of gas, such as air. With such a configuration, at least a portion of the reinforcement layer 8 serves as the partition wall 30 which forms the air chamber. The reinforcement layer 8 is coupled with the inner liner 7 at first coupling portions 9a and second coupling portions 9b, but is separated from the inner liner 7 between each first coupling portion 9a and each second coupling portion 9b. In this embodiment, two first coupling portions 9a are provided at positions symmetrical with respect to the tire equator plane CL. Two second coupling portions 9b are provided at positions symmetrical with respect to the tire equator plane CL. The first coupling portion 9a and the second coupling portion 9b are provided at positions different in the tire radial direction. The second coupling portion 9b is located at a position outward of the first coupling portion 9a in the tire radial direction.

In this embodiment, when the tire 1 is filled with air, in the inner cavity of the tire, air chambers are formed in spaces surrounded by the inner liner 7 and the reinforcement layer 8 and in a space located at a position inward of the reinforcement layer 8 in the tire width direction, an internal pressure being applied to the air chambers. Therefore, in this embodiment, portions of the reinforcement layer 8 each of which is located between the first coupling portion 9a and the second coupling portion 9b respectively serve as the above-mentioned partition walls 30a and 30b. That is, the pair of partition walls 30a and 30b are respectively located in the half portions of the tire, and are coupled with a tire inner wall surface at the first coupling portions 9a and the second coupling portions 9b. Here, the state where the tire 1 is filled with air indicates a state where the tire 1 is mounted on the applicable rim, and is filled with a predetermined internal pressure. For example, the state where the tire 1 is filled with air includes the above-mentioned reference state. The air chamber formed in the space located at a position inward of the reinforcement layer 8 in the tire width direction is referred to as "air chamber 20b". The air chambers formed in the spaces surrounded by the reinforcement layer 8 and tire inner wall surface of the sidewall portion 3 are respectively referred to as "air chamber 20a" and "air chamber 20c".

Each of the air chambers 20a, 20b, and 20c is formed in one space continuous in the tire circumferential direction. However, the configuration is not limited to the above. For example, each of the air chambers 20a, 20b, and 20c may be formed of a plurality of small air chambers formed by dividing a space in the tire circumferential direction by partition walls or the like provided to extend in a direction intersecting with the tire circumferential direction.

The reinforcement layer 8 may be formed on the inner wall surface of the tire 1 by a desired method. For example, at the time of forming the reinforcement layer 8, the inner liner 7 and the reinforcement layer 8 may be caused to overlap and adhere with each other in the tire width direction in a state where the reinforcement layer 8 can be released in each region between the first coupling portion 9a and the second coupling portion 9b. For example, when a release agent, such as silicone oil, is applied to release regions each of which is located between the first coupling portion 9a and the second coupling portion 9b on the surface of the reinforcement layer 8 located outward in the tire width direction, the inner liner 7 and the reinforcement layer 8 may be caused to adhere with each other in a state where at least a portion of the reinforcement layer 8 can be released. Alternatively, when molding is performed in a state where a release member is sandwiched in each release region between the inner liner 7 and the reinforcement layer 8, a releasing operation can be easily performed, and the inner liner 7 and the reinforcement layer 8 may be caused to adhere with each other in a state where at least a portion of the reinforcement layer 8 can be released. The release member may be, for example, a knitted member, a woven fabric member, or a cotton member which has stretchability and fine mesh which prevents permeation of rubber during vulcanization, a member obtained by overlapping a plurality of these members, or a resin film. With the use of such a forming method, the tire 1 can be manufactured with a simpler manufacturing method and hence, it is possible to prevent an increase in manufacturing costs.

The description has been made for an example where each partition wall 30 is formed such that at least a portion of the reinforcement layer 8 is released from the inner liner 7. However, the configuration of the partition wall 30 or the method for forming the partition wall 30 is not limited to the above. For example, the partition wall 30 may be formed such that the first coupling portion 9a and the second coupling portion 9b of a suitable sheet-like member having low permeability of gas, such as air, are caused to adhere to the tire inner wall surface. Alternatively, the partition wall 30 may be formed such that portions of an outer surface of a suitable hollow ring-like member having low permeability of gas, such as air, are caused to adhere to the tire inner wall surface by using the first coupling portion 9a and the second coupling portion 9b as end portions.

In this embodiment, at least a portion of another member included in the tire 1 may be used as the reinforcement layer 8 which forms the partition walls 30. For example, the reinforcement layer 8 may be a carcass layer which forms a portion of the above-mentioned carcass 5. In such a case, the carcass layer forming the reinforcement layer 8 is coupled with another carcass layer at the first coupling portions 9a and the second coupling portions 9b, but is separated from the other carcass layer in each range between the first coupling portion 9a and the second coupling portion 9b. With such a configuration, the carcass layer can serve as partition walls which form the air chambers. The reinforcement layer 8 may also be an inner liner layer which forms a portion of the above-mentioned inner liner 7. In such a case, the inner liner layer forming the reinforcement layer 8 is coupled with another inner liner layer at the first coupling portion 9a and the second coupling portion 9b, but is separated from another inner liner layer in each range between the first coupling portion 9a and the second coupling portion 9b. With such a configuration, the inner liner layer can serve as partition walls which form the air chambers.

The partition wall 30 has strength which prevents expansion and deformation of the partition wall 30 in a state where the air chamber 20a or 20c which faces the partition wall 30 is filled with a predetermined internal pressure. For example, the strength of the partition wall 30 may be set to strength which prevents expansion and deformation of the partition wall 30 caused by the internal pressures of the air chambers 20a and 20c when the air chambers 20a and 20c are filled with the prescribed internal pressures in a state where the air chamber 20b is not filled with air. For example, strength of the partition wall 30 may be set to strength which allows the air chambers 20a and 20c to support the maximum load or a certain load of less than the maximum load without causing expansion or deformation when the air chambers 20a and 20c are filled with the predetermined internal pressure in a state where the air chamber 20b is not filled with air. To increase strength of the partition wall 30, the partition wall 30 may be, for example, a member which constrains expansion and deformation, such as a member formed by covering an organic fiber, a glass fiber, a steel cord or the like by rubber composition or a resin, or a member made of rubber composition having high hardness.

The first coupling portions 9a and the second coupling portions 9b of the partition walls 30 can be coupled with the tire inner wall surface at positions where the air chambers 20a and 20c can support the maximum load or a certain load of less than the maximum load when the air chambers 20a and 20c are filled with the predetermined internal pressure in a state where the air chamber 20b is not filled with air. For example, each first coupling portion 9a may be coupled with the tire inner wall surface at a position outward of the bead core 2a of the bead portion 2 in the tire radial direction. Further, for example, each second coupling portion 9b may be coupled with the tire inner wall surface at a position outward of the ground contact edge of the tread portion 4 in the tire width direction. However, the second coupling portion 9b may also be coupled with the tire inner wall surface at a position inward of the ground contact edge of the tread portion 4 in the tire width direction.

Figure 8:
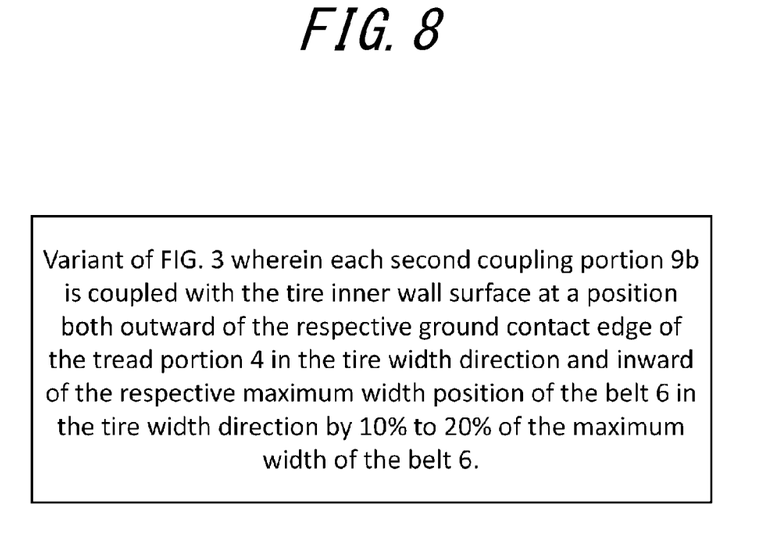
FIG. 8 is a variant of FIG. 3 wherein each second coupling portion is coupled with the tire inner wall surface at a position both outward of the respective ground contact edge of the tread portion in the tire width direction and inward of the respective maximum width position of the belt in the tire width direction by 10% to 20% of the maximum width of the belt.

In FIG. 3, each second coupling portion 9b is coupled with the tire inner wall surface at a position outward of the maximum width position of the belt 6 in the tire width direction. However, the configuration is not limited to the above. As shown in FIG. 8 the second coupling portion 9b may also be coupled with the tire inner wall surface at a position inward of the maximum width position of the belt 6 in the tire width direction, preferably, at a position inward of the maximum width position of the belt 6 in the tire width direction by 10 to 20% of the maximum width of the belt. Such a configuration allows a load applied to the air chambers 20a and 20c to be supported by the belt 6 when air is leaking from the air chamber 20b due to tire failure and hence, supporting capacity during tire failure can be further improved.

The tire 1 further includes the ventilation members 10. Each ventilation member 10 connects the plurality of air chambers 20 disposed adjacent to each other in a state where ventilation is allowed. The ventilation member 10 is a valve, for example. However, the ventilation member 10 is not limited to a valve, and may be any device, such as a mechanical valve or a solenoid valve, which allows ventilation between the air chambers 20. The ventilation member 10 may be disposed at any position on the partition wall 30. For example, as illustrated in FIG. 3, in this embodiment, the ventilation member 10 is disposed between the first coupling portion 9a and the second coupling portion 9b at a position where the ventilation member 10 penetrates through the reinforcement layer 8. The partition wall 30a includes one ventilation member 10a, and the partition wall 30b includes one ventilation member 10b. With such a configuration, the ventilation member 10a connects the air chamber 20a and the air chamber 20b in a state where ventilation is allowed. The ventilation member 10b connects the air chamber 20b and the air chamber 20c in a state where ventilation is allowed. In FIG. 3, one ventilation member 10 is disposed on each partition wall 30. However, the number of ventilation members 10 is not limited to the above. The desired number of ventilation members 10 may be disposed in the tire 1 according to the application of the tire 1. Further, in this embodiment, each ventilation member 10 is disposed at a position where the ventilation member 10 connects two air chambers 20, which are defined by the partition wall 30 and disposed adjacent to each other, in a state where ventilation is allowed. However, the configuration is not limited to the above. The ventilation member 10 may be disposed at a position where the ventilation member 10 connects three or more air chambers 20, which are defined by the partition walls 30 and disposed adjacent to each other, in a state where ventilation is simultaneously allowed.

The tire 1 may also include a ventilation member at a position where the ventilation member penetrates through the outer wall surface of the tire. The ventilation member may have a configuration identical to the configuration of the above-mentioned ventilation member 10. With such a configuration, the ventilation member can connect any one of the air chambers 20 and the outside of the tire in a state where ventilation is allowed. For example, by disposing the ventilation member at a position where the ventilation member penetrates through the inner liner 7 and the sidewall portion 3, the ventilation member can connect the air chamber 20a or 20c and the outside of the tire in a state where ventilation is allowed. Such a configuration allows air to be repeatedly filled into the air chamber 20 directly through the ventilation member without passing through the valve 41 of the rim 40 even in a state where the multi air chamber tire 1 is mounted on the rim 40 and hence, convenience of the multi air chamber tire is improved.

The ventilation member 10 can regulate ventilation between the plurality of air chambers 20 connected in a state where ventilation is allowed. The ventilation member 10 includes, for example, a ventilation passage for connecting the plurality of air chambers 20 in a state where ventilation is allowed. For example, the ventilation member 10 can regulate ventilation between the plurality of air chambers 20 based on a predetermined condition. The predetermined condition may be a condition indicating that a gas is leaking to the outside of the tire from at least one of the plurality of air chambers 20 due to tire failure, such as a puncture. In such a case, the ventilation member 10 can release the ventilation passage to allow ventilation between the plurality of air chambers 20 in normal conditions, and the ventilation member 10 can close the ventilation passage to shut off ventilation between the plurality of air chambers 20 when the predetermined condition is satisfied. Alternatively, the predetermined condition may be a condition indicating that air is being injected into at least one of the plurality of air chambers 20 from the outside of the tire. In such a case, the ventilation member 10 can close the ventilation passage to shut off ventilation between the plurality of air chambers 20 in normal conditions, and the ventilation member 10 can release the ventilation passage to allow ventilation between the plurality of air chambers 20 when the predetermined condition is satisfied.

The ventilation member 10 can regulate ventilation between the plurality of air chambers 20 by a desired method. For example, the ventilation member 10 may be able to allow or shut off ventilation between the air chambers 20, may be able to regulate the flow rate of air between the air chambers 20, or may be able to regulate a flow direction of air between the air chambers 20.

The ventilation member 10 may include a detection unit 11 which detects whether or not the predetermined condition is satisfied. When the detection unit 11 detects that the predetermined condition is satisfied, the ventilation member 10 can regulate ventilation between the plurality of air chambers 20 disposed adjacent to each other and connected via the ventilation member 10 in a state where ventilation is allowed. The ventilation member 10 includes a drive unit which drives the ventilation member 10 when the detection unit 11 detects that the predetermined condition is satisfied. The drive unit may be communicably connected with the detection unit 11 by wired or wireless communication. When the drive unit receives, from the detection unit 11, a signal indicating that the predetermined condition is satisfied, the drive unit can drive the ventilation member 10 by a mechanical method or an electric method. For example, the drive unit may be a switch which mechanically controls opening and closing of a valve provided in the ventilation passage of the ventilation member 10. For example, the drive unit may be an electronic circuit or the like which is communicably connected, by wired or wireless communication, with the valve provided in the ventilation passage of the ventilation member 10, and which transmits a signal for controlling opening and closing of the valve.

For example, the predetermined condition may be a condition relating to a differential pressure between the air chambers 20 connected via the ventilation member 10 in a state where ventilation is allowed. In such a case, the detection unit 11 may include a pressure sensor. When the detection unit 11 detects that a differential pressure of a predetermined amount or more is generated between the air chambers 20 connected in a state where ventilation is allowed, the ventilation member 10 can regulate ventilation between the plurality of air chambers 20 connected. For example, the predetermined condition may be a condition relating to a flow rate of air flowing through the ventilation member 10. In such a case, the detection unit 11 may include a flowmeter. When the detection unit 11 detects that a flow rate of air of a predetermined amount or more is generated in the ventilation member 10, the ventilation member 10 can regulate ventilation between the plurality of air chambers 20 connected. The predetermined condition is not limited to the above, and may be any condition relating to the internal pressure of the air chamber 20. The detection unit 11 may include a communication means, for example. The communication means is a wireless communication antenna, for example. However, the communication means is not limited to the above, and may be any means including equipment or a device which enables wired or wireless communication. When the detection unit 11 receives a signal notifying that the predetermined condition is satisfied, the ventilation member 10 can regulate ventilation between the plurality of air chambers 20 connected.

In FIG. 3, the detection unit 11 included in the ventilation member 10 is integrally formed with the ventilation member 10. However, the configuration is not limited to the above, and the detection unit 11 may be separate from the ventilation member 10. For example, when the detection unit 11 includes a pressure sensor, the detection unit 11 is separate from the ventilation member 10, and may be installed at a position where the detection unit 11 can measure the internal pressure of the air chamber 20. For example, when the detection unit 11 includes a flowmeter, the detection unit 11 is separate from the ventilation member 10, and may be installed at a position where the detection unit 11 can measure the flow rate of air flowing through the ventilation passage of the ventilation member 10. Further, for example, when the detection unit 11 includes a communication means, the detection unit 11 is separate from the ventilation member 10, and can be installed at a position where the detection unit 11 can receive a signal from the outside. In FIG. 3, one detection unit 11 is disposed on each ventilation member 10. However, the number of detection units 11 is not limited to the above. The desired number of detection units 11 may be disposed on the ventilation member 10 according to the application of the ventilation member 10.

(Operation Example 1 of Multi Air Chamber Tire)

Hereinafter, one example of the operation of the multi air chamber tire 1 according to one embodiment of the present disclosure will be described. As illustrated in FIG. 1, the inner cavity of the multi air chamber tire 1 is defined by the two partition walls 30a and 30b. Therefore, when the tire 1 is mounted on the rim 40, the three air chambers 20a, 20b, and 20c are formed by the partition walls 30a and 30b. The ventilation members 10a and 10b are respectively provided to the two partition walls 30a and 30b. The air chambers 20a and 20b are connected in a state where ventilation between the air chambers 20a and 20b is allowed via the ventilation member 10a. The air chambers 20b and 20c are connected in a state where ventilation between the air chambers 20b and 20c is allowed via the ventilation member 10b. In this operation example, assume that the predetermined condition is a condition indicating that air is leaking to the outside of the tire from at least one of the plurality of air chambers 20 due to tire failure, such as a puncture.

When the predetermined condition is not satisfied, the ventilation member 10 can release the ventilation passage to allow ventilation between the plurality of air chambers 20. When the predetermined condition indicating tire failure is satisfied, the ventilation member 10 can close the ventilation passage to regulate ventilation between the plurality of air chambers 20. In a state where there is no puncture or the like, the ventilation member 10 allows ventilation between the air chambers 20 and hence, the three air chambers 20a, 20b, and 20c have substantially the same internal pressure. For example, when air is filled into the air chamber 20b from the valve 41 of the rim 40 in a state where the tire 1 is mounted on the rim 40, portions of air filled into the air chamber 20b pass through the ventilation members 10a and 10b, and also reach the air chambers 20a and 20c. Accordingly, in the same manner as a tire which does not have a plurality of air chambers, air can be filled into the three air chambers 20a, 20b, and 20c of the tire 1 by filling air from the valve 41 of the rim 40.

Further, when a vehicle normally travels in a state where there is no puncture or the like, the ventilation members 10a and 10b allow ventilation between the air chambers 20a, 20b, and 20c. Therefore, when an external pressure applied to the tire 1 changes corresponding to movement of the weight of the vehicle, a change in the state of a road surface or the like, air in the three air chambers 20a, 20b, and 20c moves between the air chambers 20 and hence, internal pressures of the three air chambers 20a, 20b, and 20c are maintained at substantially the same internal pressure. With such a configuration, for example, compared with a conventional run flat tire where the sidewall portions 3 have side reinforcing rubber, it is possible to lessen a reduction in ride comfort and fuel efficiency.

Figure 4:
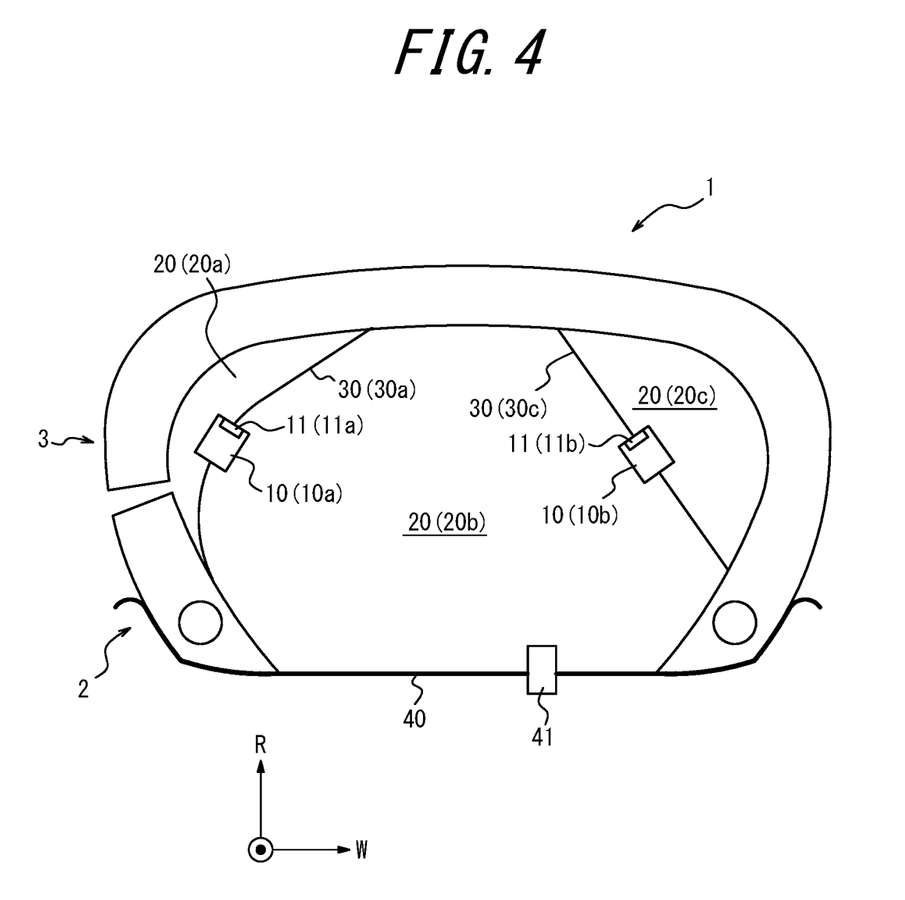
FIG. 4 is a schematic view schematically illustrating one example of a deformed mode of the multi air chamber tire illustrated in FIG. 1 at the time of a puncture.

In contrast, for example, as illustrated in FIG. 4, when a puncture or the like occurs in the sidewall portion 3 of the half portion of the tire which the air chamber 20a faces, air in the air chamber 20a leaks to the outside of the tire from the damaged portion where the puncture or the like occurs. At this point, a detection unit 11a of the ventilation member 10a detects that the predetermined condition is satisfied due to leakage of air from the air chamber 20a. For example, the detection unit 11a can detect a reduction in internal pressure of the air chamber 20a or 20b by a pressure sensor included in the detection unit 11a. Alternatively, the detection unit 11a can detect that a flow rate of a predetermined value or more is generated in the ventilation member 10 by a flowmeter included in the detection unit 11a. Alternatively, the detection unit 11a can detect, by a communication means included in the detection unit 11a, reception of a signal indicating leakage of air from the air chamber 20a to the outside of the tire.

When the detection unit 11a detects that the predetermined condition is satisfied, the ventilation member 10a regulates ventilation through the ventilation member 10a. For example, the ventilation member 10a can shut off ventilation between the air chamber 20a and the air chamber 20b. Alternatively, the ventilation member 10a can shut off ventilation from the air chamber 20b to the air chamber 20a while maintaining ventilation from the air chamber 20a to the air chamber 20b. With such a configuration, the ventilation member 10a prevents leakage of air in the air chamber 20b to the outside of the tire.

In a state where leakage of air in the air chamber 20a to the outside of the tire proceeds, the ventilation member 10a shuts off ventilation between the air chambers connected via the ventilation member 10a and hence, the internal pressure of the air chamber 20a reduces to a level lower than the internal pressure of the air chamber 20b. With such reduction in internal pressure of the air chamber 20a, the partition wall 30a is brought into close contact with the tire inner wall surface on the air chamber 20a side. However, ventilation from the air chamber 20b to the air chamber 20a is shut off by the ventilation member 10a and hence, it is possible to prevent ventilation of a predetermined amount or more from the air chamber 20c to the air chamber 20b via the ventilation member 10b. At this point, a detection unit 11b of the ventilation member 10b does not detect that the predetermined condition is satisfied due to leakage of air from the air chamber 20a. The ventilation member 10b continues to allow ventilation between the air chamber 20b and the air chamber 20c connected via the ventilation member 10b. With such a configuration, even when shapes of the air chambers 20b and 20c are deformed, the internal pressures of the air chamber 20b and the air chamber 20c are maintained at substantially the same internal pressure. Therefore, the air chamber 20b and the air chamber 20c can lessen a reduction in ride comfort of a vehicle and fuel efficiency after a puncture occurs.

Figure 5:
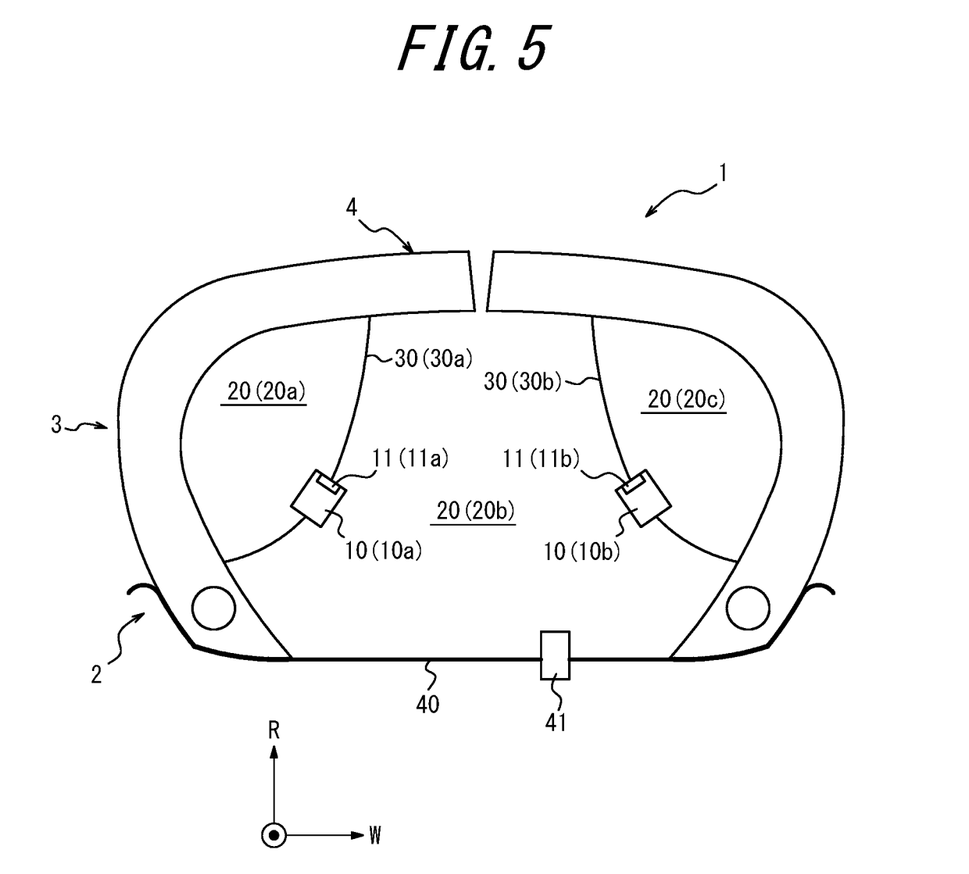
FIG. 5 is a schematic view schematically illustrating another example of the deformed mode of the multi air chamber tire illustrated in FIG. 1 at the time of a puncture.

For example, when a puncture or the like occurs in the tread portion 4 as illustrated in FIG. 5, air in the air chamber 20b leaks to the outside of the tire from the damaged portion where the puncture or the like occurs. At this point, both the detection unit 11a of the ventilation member 10a and the detection unit 11b of the ventilation member 10b detect that the predetermined condition is satisfied due to leakage of air from the air chamber 20b.

When the detection unit 11a detects that the predetermined condition is satisfied, the ventilation member 10a shuts off ventilation through the ventilation member 10a. When the detection unit 11b detects that the predetermined condition is satisfied, the ventilation member 10b shuts off ventilation through the ventilation member 10b. With such a configuration, the ventilation member 10a prevents leakage of air in the air chamber 20a to the outside of the tire, and the ventilation member 10b prevents leakage of air in the air chamber 20c to the outside of the tire. Therefore, two air chambers 20a and 20c support a vehicle body, thus allowing travel after a puncture occurs. That is, the air chambers 20a and 20c play a role substantially equivalent to the role of the side reinforcing rubber disposed on each sidewall portion of the conventional run flat tire, for example.

(Processing Example 1 of Multi Air Chamber Tire)

Figure 6:
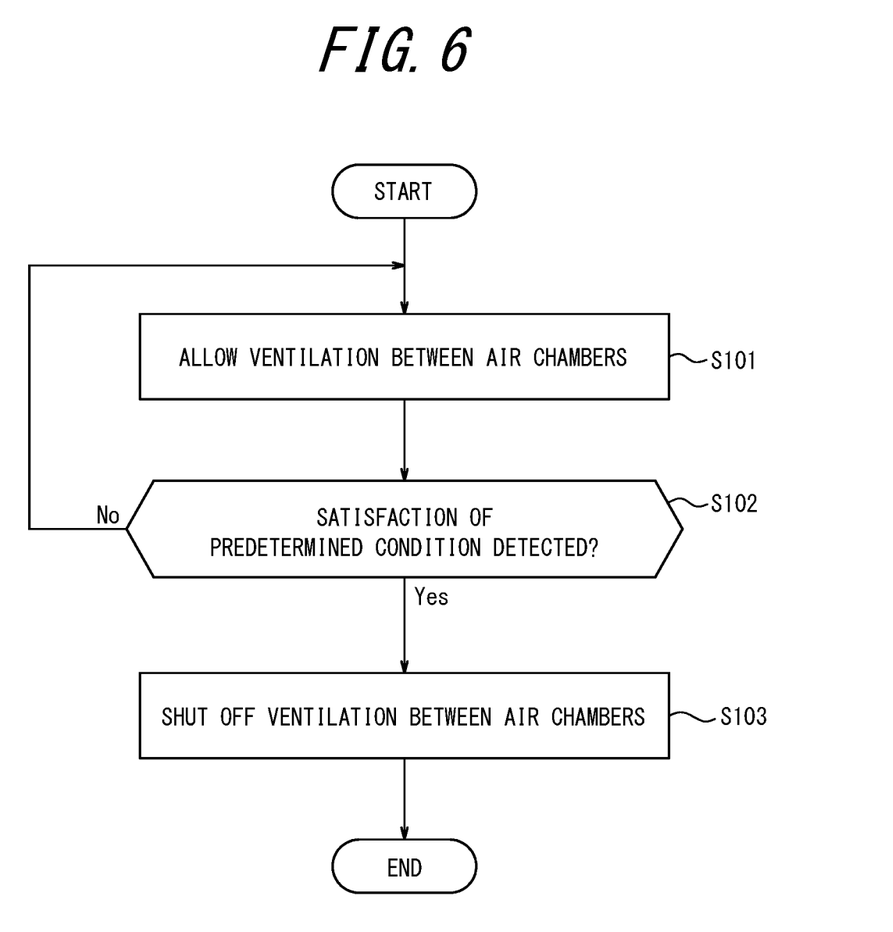
FIG. 6 is a flowchart illustrating one example of processing performed by a ventilation member according to one embodiment of the present disclosure.

The description will be made with reference to FIG. 6 for one example of processing performed by the ventilation member 10 including in the multi air chamber tire 1 according to one embodiment of the present disclosure.

Step S101: The ventilation member 10 allows ventilation between the air chambers 20 connected via the ventilation member 10.

Step S102: The detection unit 11 of the ventilation member 10 detects that the predetermined condition is satisfied. Assume that the predetermined condition is a condition indicating that air is leaking to the outside of the tire from at least one of the plurality of air chambers 20 due to tire failure, such as a puncture. When it is not detected by the detection unit 11 that the predetermined condition is satisfied (step S102—No), processing from step S101 is repeated, and the ventilation member 10 maintains a state where the ventilation member 10 allows ventilation between the air chambers 20 connected via the ventilation member 10.

Step S103: When the detection unit 11 detects that the predetermined condition is satisfied (step S102—Yes), the ventilation member 10 shuts off ventilation between the air chambers 20 connected via the ventilation member 10.

(Operation Example 2 of Multi Air Chamber Tire)

Hereinafter, another example of the operation of the multi air chamber tire 1 according to one embodiment of the present disclosure will be described. As illustrated in FIG. 1, the inner cavity of the multi air chamber tire 1 is defined by the two partition walls 30a and 30b. Therefore, when the tire 1 is mounted on the rim 40, the three air chambers 20a, 20b, and 20c are formed by the partition walls 30a and 30b. The ventilation members 10a and 10b are respectively provided to the two partition walls 30a and 30b. The air chambers 20a and 20b are connected in a state where ventilation between the air chambers 20a and 20b is allowed via the ventilation member 10a. The air chambers 20b and 20c are connected in a state where ventilation between the air chambers 20b and 20c is allowed via the ventilation member 10b. In this operation example, assume that the predetermined condition is a condition indicating that air is being injected into at least one of the plurality of air chambers 20 from the outside of the tire.

When the predetermined condition is not satisfied, the ventilation member 10 can close the ventilation passage to shut off ventilation between the plurality of air chambers 20. When the predetermined condition is satisfied indicating that air is being injected from the outside, the ventilation member 10 can release the ventilation passage to allow ventilation between the plurality of air chambers 20. When air is not being injected, ventilation between the air chamber 20a and the air chamber 20b is shut off by the ventilation member 10a. Ventilation between the air chamber 20b and the air chamber 20c is shut off by the ventilation member 10b. With such a configuration, the three air chambers 20a, 20b, and 20c can serve as air chambers independent from each other. For example, the air chambers 20a, 20b, and 20c may have substantially the same internal pressure, or may have different internal pressures.

For example, as illustrated in FIG. 4, when a puncture or the like occurs in the sidewall portion 3 of the half portion of the tire which the air chamber 20a faces, air in the air chamber 20a leaks to the outside of the tire from the damaged portion where the puncture or the like occurs. At this point, the ventilation member 10a shuts off ventilation between the air chamber 20a and the air chamber 20b. Accordingly, the air chamber 20a and the air chamber 20b are defined by the partition wall 30a and hence, air does not leak to the outside of the tire from the air chamber 20b and the air chamber 20c. Therefore, the air chamber 20b and the air chamber 20c supports a vehicle body, thus allowing travel after a puncture occurs. At this point, air in the air chamber 20a leaks to the outside of the tire and hence, the internal pressure of the air chamber 20a reduces to a level lower than the internal pressure of the air chamber 20b and hence, the partition wall 30a is brought into close contact with the tire inner wall surface on the air chamber 20a side. The partition wall 30a is brought into close contact with the tire inner wall surface on the air chamber 20a side and hence, leakage of air from the damaged portion may be reduced.

Further, for example, when a puncture or the like occurs in the tread portion 4 as illustrated in FIG. 5, air in the air chamber 20b leaks to the outside of the tire from the damaged portion where the puncture or the like occurs. At this point, the ventilation member 10a shuts off ventilation between the air chamber 20a and the air chamber 20b. Further, the ventilation member 10b shuts off ventilation between the air chamber 20b and the air chamber 20c. Accordingly, the air chamber 20a and the air chamber 20c are defined by the partition wall 30a and the partition wall 30b, thus being separated from the air chamber 20b and hence, air does not leak to the outside of the tire from the air chamber 20a and the air chamber 20c. Therefore, the air chamber 20a and the air chamber 20c supports a vehicle body, thus allowing travel after a puncture occurs.

In contrast, for example, when air is being injected into the air chamber 20b from the valve 41 of the rim 40 in a state where the tire 1 is mounted on the rim 40, the detection units 11a and 11b detect that the predetermined condition is satisfied due to injection of air into the air chamber 20b. For example, the detection units 11a and 11b can detect an increase in internal pressure of the air chamber 20b by pressure sensors included in the detection units 11a and 11b. Alternatively, the detection units 11a and 11b can detect, by communication means included in the detection units 11a and 11b, a reception of a signal indicating that air is being injected into the air chamber 20b from the outside.

When the detection unit 11a detects that the predetermined condition is satisfied, the ventilation member 10a allows ventilation through the ventilation member 10a. When the detection unit 11b detects that the predetermined condition is satisfied, the ventilation member 10b allows ventilation through the ventilation member 10b. With such a configuration, for example, when air is injected into the air chamber 20b from the valve 41 of the rim 40 in a state where the tire 1 is mounted on the rim 40, portions of injected air pass through the ventilation members 10a and 10b, and reach the air chambers 20a and 20c. Accordingly, in the tire 1, the three air chambers 20a, 20b, and 20c can be filled with air by injecting air from the valve 41 of the rim 40 in the same manner as a tire which does not have a plurality of air chambers.

(Processing Example 2 of Multi Air Chamber Tire)

Figure 7:
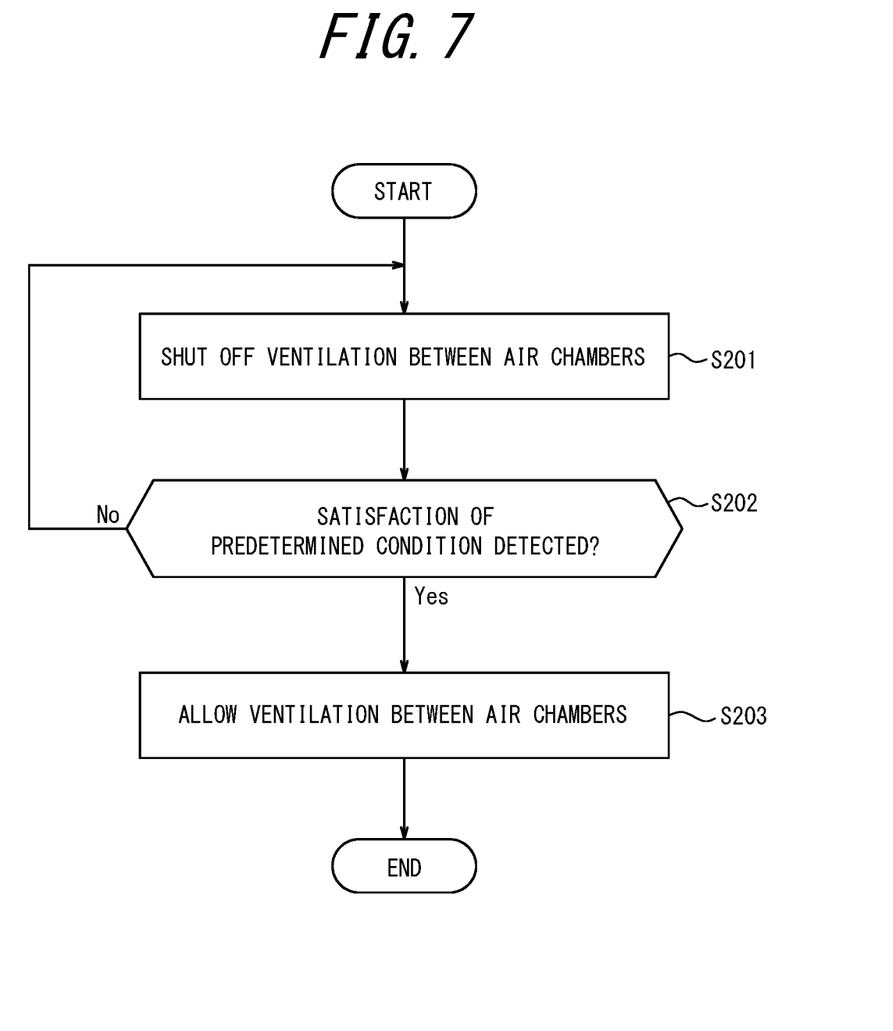
FIG. 7 is a flowchart illustrating another example of processing performed by the ventilation member according to one embodiment of the present disclosure.

The description will be made with reference to FIG. 7 for one example of processing performed by the ventilation member 10 included in the multi air chamber tire 1 according to one embodiment of the present disclosure.

Step S201: The ventilation member 10 shuts off ventilation between the air chambers 20 connected via the ventilation member 10.

Step S202: The detection unit 11 of the ventilation member 10 detects that the predetermined condition is satisfied. Assume that the predetermined condition is a condition indicating that air is being injected into at least one of the plurality of air chambers 20 from the outside of the tire. When it is not detected by the detection unit 11 that the predetermined condition is satisfied (step S202-No), processing from step S201 is repeated, and the ventilation member 10 maintains a state where the ventilation member 10 shuts off ventilation between the air chambers 20 connected via the ventilation member 10.

Step S203: When the detection unit 11 detects that the predetermined condition is satisfied (step S202—Yes), the ventilation member 10 allows ventilation between the air chambers 20 connected via the ventilation member 10.

As has been described above, the multi air chamber tire 1 according to the present disclosure includes the partition wall 30 configured to define and form the plurality of air chambers 20 disposed adjacent to each other in the inner cavity of the tire, and the ventilation member 10 provided to the partition wall 30, and configured to connect the plurality of air chambers 20 in a state where ventilation is allowed. The ventilation member 10 allows ventilation between the plurality of air chambers 20 when the predetermined condition is satisfied indicating that fluid is being injected into at least one of the plurality of air chambers 20 from the outside of the tire, and the ventilation member 10 shuts off the ventilation between the plurality of air chambers 20 when the predetermined condition is not satisfied. Such a configuration allows the plurality of air chambers 20 to be separated from each other by the partition wall 30 except for when a gas, such as air, is injected into the tire 1 from the outside. Therefore, when air leaks to the outside of the tire from at least one of the plurality of air chambers 20 due to tire failure, such as a puncture, it is possible to prevent leakage of air from another air chamber 20 having no air leakage without performing control, such as shutting off ventilation via the ventilation member 10, for example. Accordingly, convenience of the multi air chamber tire 1 having the plurality of air chambers 20 is improved.

It is preferable that the multi air chamber tire 1 according to the present disclosure include the detection unit 11 configured to detect whether or not the predetermined condition is satisfied. Such a configuration allows the ventilation member 10 to regulate ventilation between the plurality of air chambers 20 based on changes in the state of the plurality of air chambers 20 detected by the detection unit 11 and hence, convenience of the multi air chamber tire 1 having the plurality of air chambers 20 is further improved.

In the multi air chamber tire 1 according to the present disclosure, it is preferable that the detection unit 11 include the pressure sensor. Such a configuration allows the ventilation member 10 to detect a change in the state of the plurality of air chambers 20 based on changes in air pressure and hence, convenience of the multi air chamber tire 1 having the plurality of air chambers 20 is further improved.

In the multi air chamber tire 1 according to the present disclosure, it is also preferable that the detection unit 11 includes the flowmeter. Such a configuration allows the ventilation member 10 to detect a change in the state of the plurality of air chambers 20 based on changes in the flow rate of air flowing through the ventilation member 10 and hence, convenience of the multi air chamber tire 1 having the plurality of air chambers 20 is further improved.

In the multi air chamber tire 1 according to the present disclosure, it is also preferable that the detection unit 11 include the communication means. Such a configuration allows the ventilation member 10 to detect a change in the state of the plurality of air chambers 20 by receiving a signal from the outside and hence, convenience of the multi air chamber tire 1 having the plurality of air chambers 20 is further improved.

The ventilation member 10 according to the present disclosure is used in the above-mentioned multi air chamber tire 1. Such a configuration allows the ventilation member 10 to shut off ventilation between the plurality of air chambers 20 when air is leaking to the outside of the tire from at least one of the plurality of air chambers 20 due to tire failure, such as a puncture, or such a configuration allows the ventilation member 10 to allow ventilation between the plurality of air chambers 20 when air is being injected into at least one of the plurality of air chambers 20 from the outside of the tire. With such a configuration, convenience of the multi air chamber tire 1 having the plurality of air chambers 20 is improved.

A method for controlling an internal pressure of the multi air chamber tire 1 according to one embodiment of the present disclosure includes the steps of: allowing, by the ventilation member 10, ventilation between the plurality of air chambers 20 when the predetermined condition is satisfied indicating that fluid is being injected into at least one of the plurality of air chambers 20 from the outside of the tire; and shutting off, by the ventilation member 10, the ventilation between the plurality of air chambers 20 when the predetermined condition is not satisfied. Such a configuration allows the ventilation member 10 to shut off ventilation between the plurality of air chambers 20 when air is leaking to the outside of the tire from at least one of the plurality of air chambers 20 due to tire failure, such as a puncture, or such a configuration allows the ventilation member 10 to allow ventilation between the plurality of air chambers 20 when air is being injected into at least one of the plurality of air chambers 20 from the outside of the tire. With such a configuration, convenience of the multi air chamber tire 1 having the plurality of air chambers 20 is improved.

A method for controlling the ventilation member 10 according to one embodiment of the present disclosure is a method for controlling the ventilation member 10 of the above-mentioned multi air chamber tire 1, and the method includes the steps of: allowing, by the ventilation member 10, ventilation between the plurality of air chambers 20 when the predetermined condition is satisfied indicating that fluid is being injected into at least one of the plurality of air chambers 20 from the outside of the tire; and shutting off, by the ventilation member 10, the ventilation between the plurality of air chambers 20 when the predetermined condition is not satisfied. Such a configuration allows the ventilation member 10 to shut off ventilation between the plurality of air chambers 20 when air is leaking to the outside of the tire from at least one of the plurality of air chambers 20 due to tire failure, such as a puncture, or such a configuration allows the ventilation member 10 to allow ventilation between the plurality of air chambers 20 when air is being injected into at least one of the plurality of air chambers 20 from the outside of the tire. With such a configuration, convenience of the multi air chamber tire 1 having the plurality of air chambers 20 is improved.

The present disclosure has been described based on the drawings and the embodiments. However, note that various variations and modifications may be easily made by those who are skilled in the art based on the present disclosure. Accordingly, it is noted that these variations and modifications are included in the scope of the present disclosure. For example, components or functions included in the respective embodiments may be rearranged in a logically consistent manner. Further, the components or the functions included in the respective embodiments may be used in combination with another embodiment. The plurality of components or functions may be combined into one component or function, may be divided, or may be partially omitted.

For example, in the present disclosure, the description has been made assuming that the tire 1 includes two partition walls 30 on the tire inner wall surface. However, the configuration is not limited to the above. For example, one or three or more partition walls 30 may be provided to the tire inner wall surface of the tire 1. Alternatively, to form an air chamber 20 which is not in contact with the inner wall surface of the tire 1, the tire 1 may be provided with a partition wall 30 which is connected with only another partition wall 30, but is not connected with the tire inner wall surface. In this manner, it is possible to desirably set the number, the volume, and the shape of air chambers 20 formed in the inner cavity of the tire.

Further, for example, in the present disclosure, the description has been made assuming that the tire 1 has the symmetrical configuration with respect to the tire equator plane CL. However, the configuration of the tire 1 is not limited to the above. For example, two air chambers 20a and 20c may differ in at least one of volume and shape, the two air chambers 20a and 20c being respectively provided on the tire inner wall surface side of the pair of sidewall portions 3.

Further, for example, in the present disclosure, the description has been made assuming that the tire 1 is filled with air. However, the configuration is not limited to the above. For example, the tire 1, that is, the air chamber 20 of the tire 1 may be filled with a gas, such as nitrogen. Further, for example, a material filled into the tire 1, that is, the air chamber of the tire 1 is not limited to a gas, and fluid, such as liquid, a gel-like substance, or a granular material may be filled into the tire 1, that is, the air chamber of the tire 1.

Further, for example, in the present disclosure, the description has been made assuming that the reinforcement layer 8 is used as the partition wall 30. However, the configuration is not limited to the above. For example, the partition wall 30 may be formed of a member other than the reinforcement layer 8. For example, in the case where the tire 1 includes a tube, the inner cavity of the tire 1 may be partitioned into a plurality of spaces by the tube. For example, by providing one or more partition walls 30 on the inside of one tube which is brought into close contact with the inner wall surface of the tire 1, the plurality of air chambers 20 can be formed in the tire 1. Alternatively, by providing a plurality of tubes in the inner cavity of the tire 1, the plurality of air chambers 20 can be formed in the tire 1. In such a case, portions of the outer wall of the tube serve as the partition walls 30.

REFERENCE SIGNS LIST 1 multi air chamber tire
2 bead portion
2a bead core
2b bead filler
3 sidewall portion
4 tread portion
5 carcass
5a carcass main body portion
5b carcass fold-back portion
6 belt
7 inner liner
8 reinforcement layer
9a first coupling portion
9b second coupling portion
10 (10a, 10b) ventilation member
11 (11a, 11b) detection unit
20 (20a, 20b, 20c) air chamber
30 (30a, 30b) partition wall
40 rim
41 valve

The invention claimed is:

1. A multi air chamber tire comprising:
a tread portion having a pair of ground contact edges and comprising a belt;
a pair of bead portions;
a pair of sidewall portions extending between the tread portion and the pair of bead portions;
an inner liner;
partition walls respectively provided to half portions of the tire which are defined with respect to a tire equator plane, the partition walls partitioning an inner cavity of the tire to form a plurality of air chambers disposed adjacent to each other; and
a ventilation member provided to each partition wall, and configured to connect the plurality of air chambers in a state where ventilation is allowed, wherein
the ventilation members allow ventilation among the plurality of air chambers when a predetermined condition is satisfied indicating that fluid is being injected into at least one of the plurality of air chambers from outside of the tire, and the ventilation members shut off the ventilation among the plurality of air chambers when the predetermined condition is not satisfied,
each ventilation member comprises:
a detection unit configured to detect whether or not the predetermined condition is satisfied; and
a drive unit configured to make the ventilation member allow the ventilation when the detection unit detects that the predetermined condition is satisfied, and make the ventilation member shut off the ventilation when the detection unit detects that the predetermined condition is not satisfied;
each partition wall is coupled with the inner liner at a first coupling portion and a second coupling portion, the second coupling portion being located outward of the first coupling portion in the tire radial direction,
in a state where the tire is filled with fluid, a first air chamber is formed in a space located at a position inward of the partition walls in a tire width direction, and a second air chamber is formed in each space located between a partition wall of the partition walls and the inner liner at a sidewall portion of the pair of sidewall portions, and
in each partition wall, the second coupling portion is located outside a respective one of the pair of ground contact edges in the tire width direction and inside a respective maximum width position of the belt in the tire width direction by 10% to 20% of a maximum width of the belt.

2. The multi air chamber tire according to claim 1, wherein the detection unit includes a pressure sensor.

3. The multi air chamber tire according to claim 1, wherein the detection unit includes a flowmeter.

4. The multi air chamber tire according to claim 1, wherein the detection unit includes a communication means.

5. The multi air chamber tire according to claim 1, wherein
   each of the pair of bead portions includes a bead core; and
   in each partition wall, the first coupling portion is located in the tire radial direction outside the respective bead core.

6. A method for controlling the internal pressure of the multi air chamber tire according to claim 1, the method comprising the steps of:
   allowing, by the ventilation members, ventilation among the plurality of air chambers when the predetermined condition is satisfied; and
   shutting off, by the ventilation members, the ventilation among the plurality of air chambers when the predetermined condition is not satisfied.

\* \* \* \* \*